United States Patent [19]

Oppmann

[11] 3,834,158
[45] Sept. 10, 1974

[54] VOLTAGE GENERATING CIRCUIT FOR A GAS TURBINE FUEL CONTROL SYSTEM

[75] Inventor: Richard C. Oppmann, Kokomo, Ind.

[73] Assignee: General Motors Corporation, Detroit, Mich.

[22] Filed: Mar. 21, 1973

[21] Appl. No.: 343,295

[52] U.S. Cl............................................. 60/39.28 R
[51] Int. Cl. ............................................... F02c 9/04
[58] Field of Search ................. 60/39.28 T, 39.28 R

[56] References Cited
UNITED STATES PATENTS

| | | | |
|---|---|---|---|
| 3,098,356 | 7/1963 | Joline............................. | 60/39.28 R |
| 3,381,470 | 5/1968 | Hammerstein et al......... | 60/39.28 R |
| 3,413,806 | 12/1968 | Belke et al..................... | 60/39.28 R |
| 3,421,317 | 1/1969 | Bedford ......................... | 60/39.28 R |
| 3,587,230 | 6/1971 | Schmidt ......................... | 60/39.28 R |
| 3,686,859 | 8/1972 | White............................. | 60/39.28 R |

Primary Examiner—William L. Freeh
Assistant Examiner—Robert E. Garrett
Attorney, Agent, or Firm—Paul Fitzpatrick

[57] ABSTRACT

In a fuel control system for a gas turbine engine, a fuel flow limiting signal is obtained from the difference between a voltage proportional to turbine inlet temperature and a voltage produced by an ambient temperature modified speed reference circuit. In the latter circuit, a first differential comparator passes the greater of a voltage proportional to compressor speed and a first reference voltage. A second differential comparator passes to the circuit output the lowest of the output of the first differential comparator, a second reference voltage and a third reference voltage which varies with ambient air temperature.

4 Claims, 3 Drawing Figures

VOLTAGE GENERATING CIRCUIT FOR A GAS TURBINE FUEL CONTROL SYSTEM

BACKGROUND OF THE INVENTION

Gas turbine engines, due to the complexity of their operation, are generally provided with an automatic control system adjustable by the operator to regulate engine speed by controlling the rate of fuel flow to the engine. In most gas turbine applications it is desirable, in order to maximize power output, to operate as closely as possible to the maximum turbine inlet temperature that will not cause surging or damage to engine materials. The maximum allowable turbine inlet temperature is an especially critical factor during engine acceleration, since an increase in fuel flow necessary to cause acceleration results in an increase in turbine inlet temperature which, if not limited, can easily exceed the maximum allowable turbine inlet temperature. It is therefore desirable to include in the control system for a gas turbine engine an acceleration limiting system which will prevent turbine inlet temperatures higher than the maximum allowable but allow the engine operator to obtain the highest permissible turbine inlet temperature to maximize engine power output and the highest fuel flow rate to maximize acceleration. The design of such a control system is complicated by the fact that the maximum permissible turbine inlet temperature on any given engine varies with both compressor speed and ambient air temperature.

SUMMARY OF THE INVENTION

It is proposed to include in the fuel valve control system of a gas turbine engine a negative feedback loop in which the signal indicative of turbine inlet temperature is summed negatively with the other signals controlling the fuel control valve to limit the fuel flow rate with increasing turbine inlet temperatures. To produce the desired variability of maximum turbine inlet temperature with compressor speed and ambient temperatures, the turbine inlet temperature signal, before being summed with the signals controlling the fuel control valve, is modified by being summed with a signal which is the output of an ambient temperature modified speed reference circuit. This circuit, provided with the engine compressor speed signal used in the normal compressor speed governor loop, generates an output signal responsive to the compressor speed signal, internal design parameters, and ambient temperature which, when summed into the turbine inlet temperature signal feedback loop, produces the desired variations of maximum turbine inlet temperature with compressor speed and ambient temperature. The proposed ambient modified speed reference circuit comprises a pair of differential comparator stages, in each of which an input voltage is compared with one or more reference voltages, which may be constant or varying with ambient temperature, one of the voltages being chosen as the output voltage. The input voltage to the first stage is the compressor speed signal voltage and the output of the second stage is the output of the circuit. The voltage varying with the ambient temperature is produced in a voltage divider including a thermistor network.

Further details and advantages of this invention will be apparent from the following drawings and description.

DESCRIPTION OF THE PREFERRED EMBODIMENT

Figure 1:
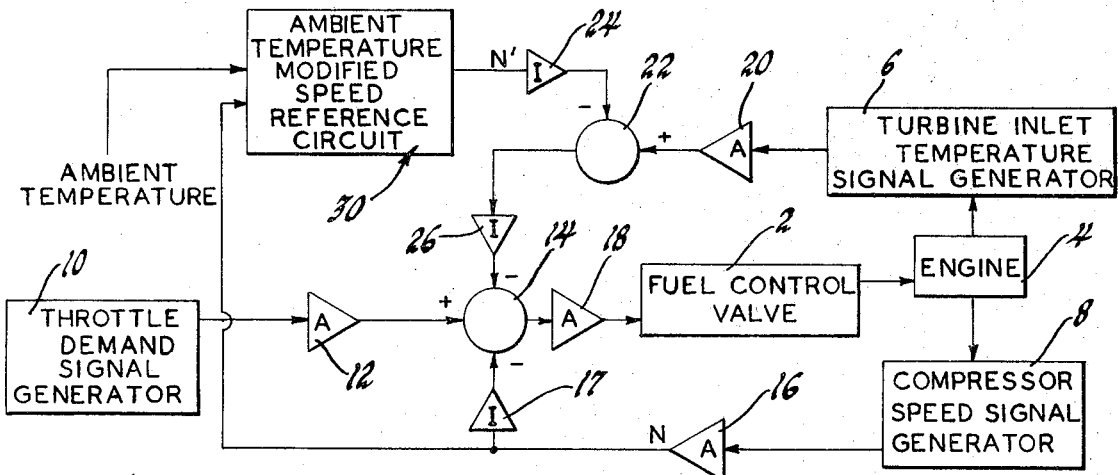
FIG. 1 is a schematic diagram of a fuel control system for a gas turbine engine.

Referring to FIG. 1, a fuel control valve 2 controls the rate of fuel flow to a gas turbine engine 4. The gas turbine engine 4 is of the conventional type which has a compressor, in which ambient air is compressed to increase its pressure, a combustor, in which the compressed air is mixed with fuel and ignited to further increase its pressure and temperature and a turbine, which is linked to the compressor through a common shaft and driven by the hot compressed gases from the combustor to actuate the compressor. Associated with the engine 4 are a turbine inlet temperature signal generator 6 and a compressor speed signal generator 8. The turbine inlet temperature signal generator 6 produces an electrical voltage which is proportional to the temperature at the inlet to the turbine, which temperature is usually the highest, or close to the highest, temperature in the engine. Thermocouples with associated circuitry are commonly used in gas turbine engines to produce signals indicating the temperature at a particular location or locations, and any such common thermocouple circuit would be suitable and will not be further described in my system.

The compressor speed signal generator 8 is a tachometer which produces an electrical voltage proportional to the rotational speed of the compressor. Such a device might be, for example, a magnetic coil positioned adjacent a toothed wheel which rotates with the compressor and appropriate electrical circuitry to convert the periodically varying electrical voltage in the coil to a DC voltage whose level is proportional to the time rate of variation of the voltage in the coil. Many such devices are known and will therefore not be further described.

A throttle demand signal generator 10 comprises a DC voltage generator, the output of which can be adjusted by the operator of the engine 4 through a conventional throttle lever or pedal. Essentially, the input by the operator into generator 10 is a request for a desired compressor speed. The output signal from the throttle demand generator 10 is amplified in amplifier 12 and fed to a summing junction 14. The output of the compressor speed signal generator 8 is amplified in the amplifier 16, the output of which is fed to the summing junction 14 through the inverter 17. The output of the summing junction 14 is fed to an amplifier 18, which supplies power to open and close the fuel control valve 2 and thereby vary the rate at which fuel is supplied to the engine 4. Since the rate of fuel flow to the engine 4 determines the speed of the turbine and thus the speed of the compressor, this portion of the system forms a compressor speed governor.

Acceleration of the engine 4 results from an increase in voltage from the throttle position signal generator 10 which causes the fuel control valve 2 to open and increase the rate of flow of fuel to the engine 4. Since this increased fuel flow can cause the turbine inlet temperature to increase rapidly beyond a desired maximum level, a temperature limiting loop is added to the governor. The output of the turbine inlet temperature signal generator 6, amplified in amplifier 20, is fed to the summing junction 22. The output of the summing junction 22 is inverted in inverter 26 and fed to the summing junction 14.

Since the maximum allowable turbine inlet temperature varies with compressor speed and ambient air temperature, and since it is usually desired to allow the maximum acceleration which will not cause the turbine inlet temperature to surpass its maximum safe level, an ambient temperature modified speed reference circuit 30 is supplied which converts the compressor speed signal N to an ambient modified speed reference signal N', fed to the summing junction 22 through the inverter 24.

Figure 2:
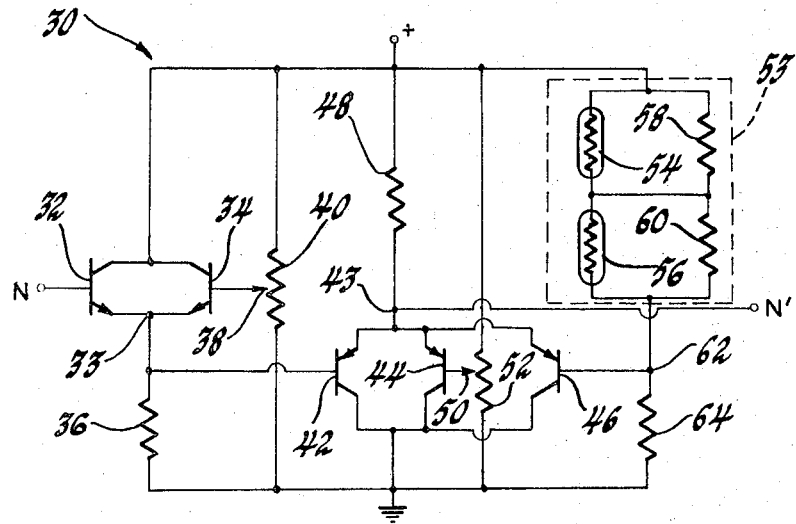
FIG. 2 is a circuit diagram of an ambient modified speed reference circuit and an ambient temperature signal generator used in the system of FIG. 1.

The ambient temperature modified speed reference circuit 30 is shown in FIG. 2. A first differential comparator comprises a pair of NPN transistors 32 and 34 with their collectors connected in common to a source of current at a positive potential and their emitters collected in common through a resistor 36 to ground. The base or control electrode of transistor 34 is connected to an adjustable tap 38 of a voltage dividing resistor 40 connected between the positive potential source and ground, which variable tap 38, resistor 40 and positive potential source form a reference voltage generator. The base of transistor 32 is connected to the output of the amplifier 16 to receive the compressor speed signal voltage N.

A second differential comparator comprises three PNP transistors 42, 44 and 46, which have their collectors connected in common to ground and their emitters connected in common, through a resistor 48, to the positive potential source. The base of transistor 44 is connected to the variable tap 50 of a voltage dividing resistor 52, which is connected between the positive potential source and ground and serves as a second reference voltage generator. The base of transistor 42 is connected to the junction 33 of the emitters of transistors 32 and 34 and the resistor 36.

A thermistor network 53 comprises a pair of series connected thermistors 54 and 56 connected in parallel with a pair of series-connected resistors 58 and 60 with the junction of the thermistors 54 and 56 connected to the junction of the resistors 58 and 60. The junction of thermistor 54 and resistor 58 is connected to the positive potential source; and the junction of thermistor 56 and resistor 60, hereinafter referred to as junction 62, is connected through a resistor 64 to ground. The base of transistor 46 is connected to junction 62.

The operation of the circuit will now be described. The compressor speed signal N, a positive DC voltage, is applied to the base of transistor 32, the input transistor for the first differential comparator. The variable tap 38 of the resistor 40 is set at a first reference voltage, this voltage having a value in this embodiment equal to the value of N corresponding to thirty percent maximum compressor speed. This voltage is sufficient to turn on the switching transistor 34; and the emitter voltage of transistor 34 is thus set at a value equal to the first reference voltage minus the diode emitter voltage drop of transistor 34, which can be considered an approximation of the first reference voltage. If the compressor speed signal voltage N is less than the first reference voltage, the emitter-base junction of transistor 32 is reverse biased and transistor 32 will not conduct. If, however, the voltage N is greater than the first reference voltage, the emitter-base junction of transistor 32 will be forward biased, transistor 32 will be turned on, and the emitter voltage of transistor 32 will rise to follow the voltage N at an interval below voltage N equal to the base-emitter diode voltage drop of transistor 32. Since the emitters of transistors 32 and 34 are connected in common, the emitter-base junction of transistor 34 is now reverse biased and the transistor 34 turns off. Thus, when the voltage N is less than the first reference voltage, the output of the first differential comparator is a voltage approximately equal to the first reference voltage; and when the voltage N is greater than the first reference voltage, the output of the first differential comparator is approximately equal to N, the error of approximation being the base-emitter diode voltage drop of an NPN transistor.

The output of the first differential comparator is applied to the base of transistor 42, the input transistor for the second differential comparator. The variable tap 50 of resistor 52 is set at a voltage corresponding to 50 percent maximum compressor speed. The voltage on the base of 42 will always be at least that corresponding to 30 percent maximum compressor speed. If this voltage is also less than that corresponding to 50 percent maximum compressor speed, transistor 42 will be turned on; the voltage at junction 43 will be equal to voltage on the base of transistor 42 plus the base-emitter diode drop of transistor 42; and the transistor 44 will be turned off, since its emitter-base junction is reverse biased. If the voltage on the base of transistor 42 exceeds the second reference voltage applied to the base of transistor 44, the voltage at junction 43 will become high enough to turn on transistor 44. The conduction of transistor 44 prevents the voltage on junction 43 from exceeding a level equal to the second reference voltage plus the base-emitter diode drop of transistor 44; and therefore the emitter-base junction of transistor 42 will be reverse biased and transistor 42 will turn off.

Thus the effect of those portions of the circuit described so far is to produce an output voltage at junction 43 approximately equal to thirty percent maximum compressor speed when N is below that level, fifty percent maximum compressor speed when N is above that level and N itself when N is between those two levels. The approximation is quite close, since the margin of error for any voltage is equal to the sum of a positive PNP base-emitter diode voltage drop from the second stage and a negative NPN base-emitter diode voltage drop from the first stage. Although the base-emitter diode drops of PNP and NPN transistors are not identical, the circuit error is reduced to the difference between them.

However, the output voltage at junction 43 is further affected by transistor 46, another reference transistor in the second differential comparator which provides for ambient temperature control. The base of transistor 46 is connected to the mid-point of a voltage divider comprising resistor 64 and a thermistor network 53. The total resistance of the thermistor network 53 varies in an inverse linear relation with ambient air temperature, the slope of which is determined by the parameters of network 53, so that the voltage at junction 62 varies proportionately with ambient temperature; and the thermistor network 53 and resistor 64 form an ambient air temperature signal voltage generator. The parameters of the thermistor network 53 and the resistance of the resistor 64 are chosen so that the voltage at junction 62 corresponds to 50 percent maximum compressor speed when the ambient air temperature is 60° F and 30 percent maximum compressor speed when the ambient air temperature is minus 13° F. The result of this is that above 60° F the transistor 46 never conducts; between 60° F and minus 13° F the transistor 46 replaces transistor 44 in limiting the output voltage of the circuit at high compressor speeds; and below minus 13° F transistor 46 determines the output voltage at all compressor speeds.

Figure 3:
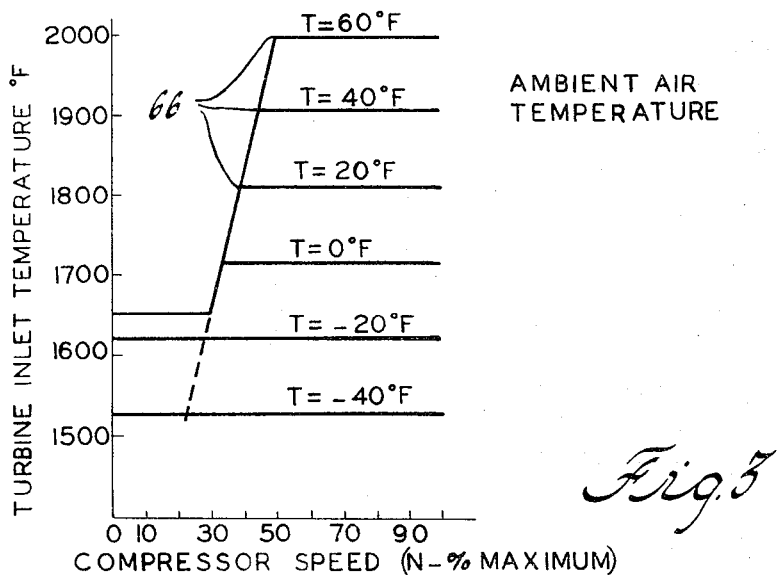
FIG. 3 is a graph of the maximum turbine inlet temperature as a function of compressor speed and ambient air temperature which is allowed by the circuit of FIG. 2 in the system of FIG. 1.

When the output voltage N' of the circuit 30 is applied through inverter 24 to the summing junction 22 of the fuel control system, the result is as seen in the graph of FIG. 3. If the ambient air temperature exceeds 60° F, the maximum turbine inlet temperature is a constant 1,650° F from 0 to 30 percent maximum compressor speed, ascends linearly to 2,000° F between 30 and 50 percent maximum compressor speed and remains a constant 2,000° F from 50 to 100 percent maximum compressor speed. As ambient temperature falls below 60° F, the upper break point 66 of the linearly ascending portion of the curve descends until, at an ambient air temperature of minus 13° F, the central ascending linear portion of the curve disappears entirely and the curve becomes a horizontal straight line with an abcissa which has a value at that temperature of approximately 1,650° F and falls from there with decreasing ambient air temperature.

The embodiment of my invention described above is not the only one that will occur to those skilled in the art. The ambient temperature modified speed reference circuit could be used in a basically hydromechanical fuel control system rather than an electronic system provided an electrical compressor speed signal is generated. My invention should be limited, therefore, only by the following claims.

I claim:

1. In a fuel control system for a gas turbine engine including compressor speed signal voltage generating means, a circuit for generating an output voltage comprising, in combination:

first reference voltage generating means; first comparator means responsive to the compressor speed signal voltage and first reference voltage for generating at its output a voltage equal to the larger of said voltages to which it is responsive; second reference voltage generating means; ambient air temperature signal voltage generating means; and second comparator means responsive to the output voltage of the first comparator means, the second reference voltage and the ambient air temperature signal voltage for generating at its output a voltage equal to the smallest of the voltages to which it is responsive.

2. In a fuel control system for a gas turbine engine including compressor speed signal voltage generating means, a circuit for generating an output voltage comprising, in combination:

first reference voltage generating means; a first differential comparator having a pair of transistors of NPN conductivity with collectors connected in common to a first potential and emitters connected in common through a resistance to a second potential, the base of one NPN transistor being connected to the compressor speed signal voltage generator and the base of the other NPN transistor being connected to the output of the first reference voltage generating means; second reference voltage generating means; ambient air temperature signal voltage generating means; a second differential comparator comprising first, second and third transistors of PNP conductivity with collectors connected in common to the second potential and emitters connected in common through a resistance to the first potential, the base of the first PNP transistor being connected to the common emitter connection of the first differential comparator, the base of the second PNP transistor being connected to the output of the second reference voltage generating means and the base of the third PNP transistor being connected to the output of the ambient air temperature signal generating means; and circuit output means connected to the common emitter connection of the second differential comparator.

3. A system for controlling fuel flow to a gas turbine engine, the system comprising, in combination:

means for generating a throttle demand signal;
means for generating an engine speed signal voltage;

electrical circuit means responsive to said engine speed signal voltage to generate a modified engine speed signal voltage, said circuit means comprising first reference voltage generating means, first comparator means responsive to said engine speed signal voltage and first reference voltage for generating at its output a voltage equal to the larger of said voltages to which it is responsive, second reference voltage generating means, ambient air temperature signal voltage generating means, and second comparator means responsive to the output voltage of the first comparator means, the second reference voltage and the ambient air temperature signal voltage for generating at its output said modified engine speed signal voltage signal corresponding to the smallest of the voltages to which it is responsive;

means for generating an engine temperature signal;

means responsive to said modified engine speed signal voltage and said engine temperature signal for generating a third reference voltage;

fuel control valve means responsive to said throttle demand signal, engine speed signal voltage, and third reference voltage to control the flow of fuel to said engine.

4. A system for controlling fuel flow to a gas turbine engine, the system comprising, in combination:

means for generating a throttle demand signal;
means for generating an engine speed signal voltage;
electrical circuit means responsive to said engine speed signal voltage to generate a modified engine speed signal voltage, said circuit means comprising first reference voltage generating means, a first differential comparator having a pair of transistors of NPN conductivity with collectors connected in common to a first potential and emitters connected in common through a resistance to a second potential, the base of one NPN transistor being connected to the engine speed signal voltage generating means and the base of the other NPN transistor being connected to the output of the first reference voltage generating means, second reference voltage generating means, ambient air temperature signal voltage generating means, a second differential comparator comprising first, second and third transistors of PNP conductivity with collectors connected in common to the second potential and emitters connected in common through a resistance to the first potential, the base of the first PNP transistor being connected to the common emitter connection of the first differential comparator, the base of the second PNP transistor being connected to the output of the second reference voltage generating means and the base of the third PNP transistor being connected to the output of the ambient air temperature signal generating means, and circuit output means connected to the common emitter connection of the second differential comparator for supplying said modified engine speed signal voltage;

means for generating an engine temperature signal; means responsive to said modified engine speed signal voltage and said engine temperature signal for generating a third reference voltage and fuel control valve means responsive to said throttle demand signal, engine speed signal voltage, and third reference voltage to control the flow of fuel to said engine.

* * * * *